United States Patent [19]
Gedgaudas

[11] 3,728,515
[45] Apr. 17, 1973

[54] ARC WELDING APPARATUS

[75] Inventor: Mindaugas E. Gedgaudas, Valencia, Calif.

[73] Assignee: Astro-Arc Co., Sun Valley, Calif.

[22] Filed: Sept. 25, 1970

[21] Appl. No.: 75,540

[52] U.S. Cl. .............................. 219/131 R, 219/135
[51] Int. Cl. ................................................ B23k 9/10
[58] Field of Search ...................... 219/131, 98, 99, 219/69, 70; 323/4, 6, 8

[56] References Cited

UNITED STATES PATENTS

| | | | |
|---|---|---|---|
| 3,051,828 | 8/1969 | Manz | 219/131 |
| 3,519,839 | 7/1970 | Nehez | 323/4 |
| 3,093,790 | 6/1963 | Ehret | 323/4 |
| 3,020,448 | 2/1962 | Fefer | 219/131 |
| 3,316,381 | 4/1967 | Gibson | 219/131 |

FOREIGN PATENTS OR APPLICATIONS

| | | | |
|---|---|---|---|
| 4,328,875 | 11/1968 | Japan | 219/69 |

OTHER PUBLICATIONS

Network Analysis by ME Van Valkenberg, Second Edition, November, 1965, pp. 82, 179, 249

*Primary Examiner*—J. V. Truhe
*Assistant Examiner*—George A. Montayne
*Attorney*—Robert E. Geauque

[57] ABSTRACT

Herein described is electronic circuitry used in an arc welding apparatus which provides continuous melting and etching action for the duration of a weld. This is achieved by providing a polarity reversing circuit comprising an electric current storage medium such as an inductor and a current limiter attached across the welding arc electrode and the workpiece. The current limiter allows a certain amount of current to be drawn from the welding power supply to induce electromagnetic energy into the inductor. The current flowing into the inductor and the current limiter bypasses the welding arc and establishes a magnetic field in the inductor. At the termination of the current from the power supply to the electrode, the current induced in the inductor by its collapsing magnetic field flows through the current limiter and through the electrode in a reverse direction, thus causing periodic polarity reversal at the electrode to perform the etching cycle.

3 Claims, 6 Drawing Figures

MINDAUGAS E. GEDGAUDAS
INVENTOR.

BY R. E. Geangue
ATTORNEY 3,728,515

ARC WELDING APPARATUS

BACKGROUND OF THE INVENTION

A. Field of the Invention

This invention relates to arc welders and more particularly to novel and improved arc welders including a polarity reversing circuit attached thereto to perform welding and etching cycles to a workpiece in a continuous sequential operation and the like.

B. Discussion of the Prior Art

In the past in order to effectively perform tungsten inert gas (TIG) welding to perform aluminum welding, it is necessary to have available alternating current or current which periodically changes polarity at the workpiece and the electrode (tungsten). The normal or "straight" polarity as referred to in the art is such that the electrode is negative with respect to the workpiece (ground). Polarity arranged in this manner provides most of the heat input to the workpiece and does the actual melting of the material to be welded.

If the polarity of the current to workpiece and the electrode is reversed, that is, the electrode is positive with respect to the workpiece, the workpiece thereafter becomes the electron emitter and an etching action is provided which removes surface films such as metal oxides from the immediate weld area. This etching improves the weld quality and provides a pristine surface condition for easiest wettability by the molten metal puddle. Since the so-called reverse polarity provides little heating of the workpiece, the workpiece electrode polarity relationship must then be again brought to the normal or straight polarity mode after a short time period of the reverse polarity mode.

To achieve an essentially continuous melting and etching action for the duration of the weld, the aforesaid polarity relationship must be reversed at rapidly occurring intervals. The prior art heretofore has caused these reversals to occur at approximately 60 times per second with essentially equal current amplitude and wave shape of both the normal or forward and the reverse polarity increments. The welding machines of this type are commonly known to those skilled in the art as AC machines, square wave machines or balanced wave AC machines.

SUMMARY OF THE INVENTION

Briefly described the present invention comprises an arc welder including a power supply adapted to provide pulsating D.C. energy across a welder electrode and a workpiece. A series connected energy storage device and a current limiter is coupled in parallel with the power supply and the workpiece and the electrode. The energy storage device is preferably an inductor.

The current from the power supply is normally in a first direction whereby electrons flow from the electrode (negative polarity) to the workpiece (ground or positive polarity) thus creating a welding cycle. At the termination of the pulse, the electrons will flow from inductor through the workpiece and back into the electrodes from the energy storage device, i.e., the inductor. The current limiter allows a certain amount of current to be drawn from the welding power supply and for this current to set up a certain amount of magnetic energy in the inductor. The current flowing in the inductor and the current limiter bypasses the welding arc. Thus, if the welding power supply is switched on and off in very short time periods so that the arc current is supplied at one time from the power supply and the next time from the energy stored in the inductor, A.C. action is observed. This invention describes an attachment in combination with a D.C. power supply to achieve A.C. operation.

DESCRIPTION OF THE DRAWINGS

These and other features and advantages will become more apparent to those skilled in the art when taken into consideration with the following detailed description wherein like reference numerals indicate like and corresponding parts throughout the several views and wherein.

DESCRIPTION OF THE PREFERRED EMBODIMENT

Figure 1:
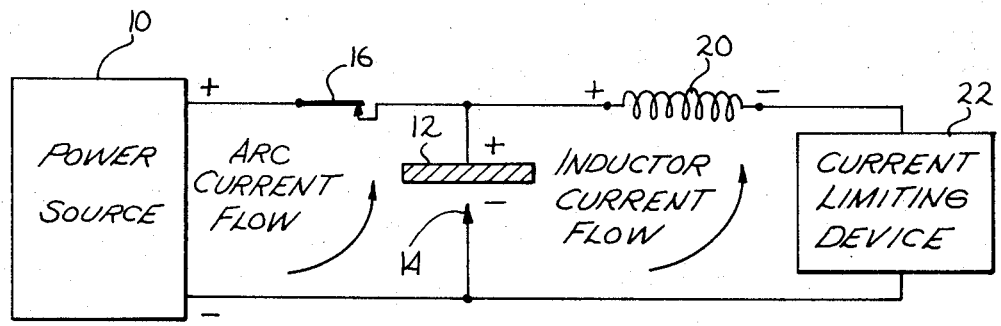
FIG. 1 is an electrical schematic diagram illustrating current flow from the electrode through the workpiece in a first direction.
Figure 5:
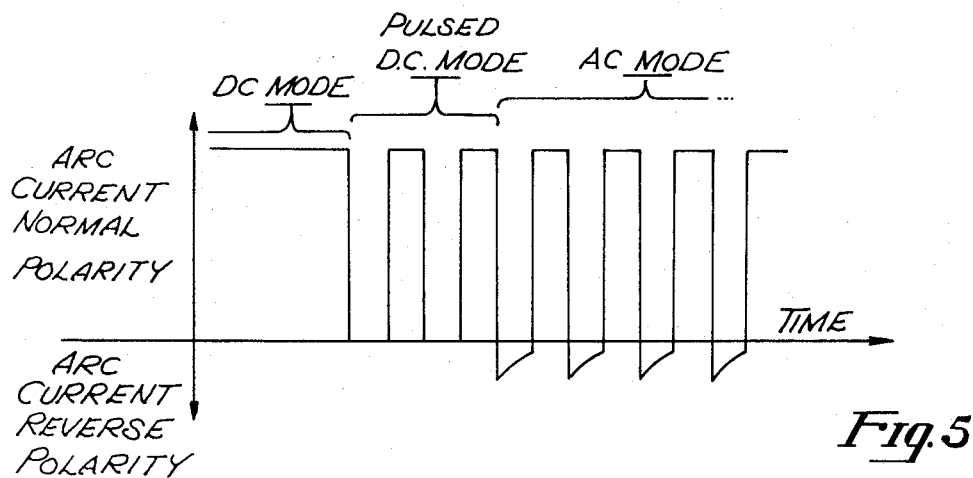
FIG. 5 is a graph illustrating arc currents in a D.C. mode, a pulsed D.C. mode and an A.C. mode.

Turning now to a more detailed description of this invention, there is shown in FIG. 1 a power source 10 which is coupled in parallel with a workpiece 12, and electrode 14 shown in a schematic manner. A switch 16 is coupled between the workpiece and the positive output of the power source. Assuming that the power source 10 is a D.C. current source, by switching the switch 16 on and off, a pulsating current source is applied across the workpiece 12 and electrode 14. This mode of operation is known as the pulsed D.C. mode as set forth in FIG. 5. If the switch 16 was continuously closed, the D.C. mode, as shown in FIG. 5, would be represented.

An inductor 20 is coupled in parallel with a suitable current limiter 22 and across the workpiece 12 and electrode 14. That is, one terminal of the inductor 20 is coupled to the workpiece 12 and the other terminal thereof is coupled to the current limiting device 22. The other end of the current limiting device is coupled to the electrode 14.

To achieve polarity reversal or A.C. action of certain types of D.C. welding sources, such as the power source 10, the circuit shown in FIG. 1 can be used to advantage where the basic polarity reversing circuit is a simple combination of the inductor 20 and the current limiting device 22 attached across the welding arc electrode 14 and the workpiece 12. The current limiter allows a certain amount of current to be drawn from the welding power supply 10. This current sets up a certain amount of electromagnetic energy in the inductor 20. The current flowing in the inductor 20 and the current limiter 22 bypasses the welding arc.

In operation of this circuit, in order to produce a current through the arc of alternating duration (i.e. operation in an A.C. mode) the welding power supply 10 must be capable of switching its output current on and off, i.e., through the switch 16, in very short time periods so that the arc current is supplied at one time from the power supply 10 and the next time from the energy storage device 20. That is, the energy stored in the inductor 20.

Figure 2:
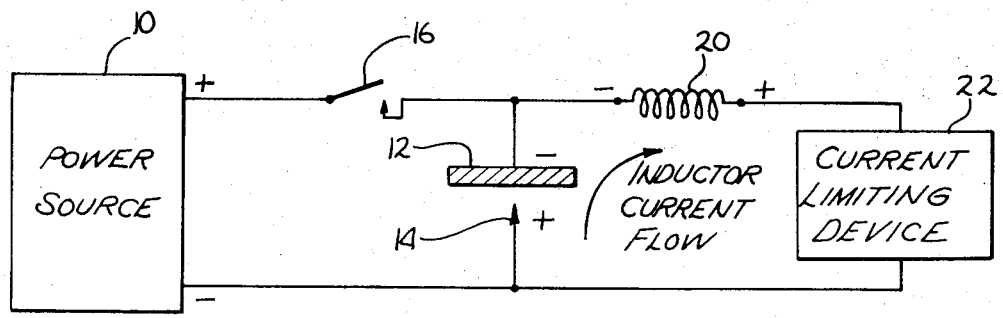
FIG. 2 is an electrical schematic diagram similar to that shown in FIG. 1 with the current flowing from the electrode through the workpiece in a different direction.

The diagram set forth in FIG. 2 illustrates current flow in reverse arc polarity during the period in which the welding power is provided by the inductor current. Assume the power supply switch 16 is open as set forth in FIG. 2 so that the welding power supply puts out no current. The previously flowing current in the inductor 20 has established a magnetic field which now collapses and therefore reverses polarity of the inductor terminals and the direction of current flow through the welding arc due to the collapsing field.

The magnitude of the reverse polarity arc current may be controlled by controlling the amount of current flowing through the inductor 20 while the power supply 10 is switched on which also determines the reverse current at the instant power supply 10 is switched off by switch 16. The reverse current will decay at a rate depending on the value of the indicator 20. In order to maintain the welding arc for continuous welding, the power supply 10 must be switched back on by the switch 16 before the reverse current drops to a level too low to sustain the ionization of the welding gap. (See FIG. 5 "AC MODE")

Figure 3:
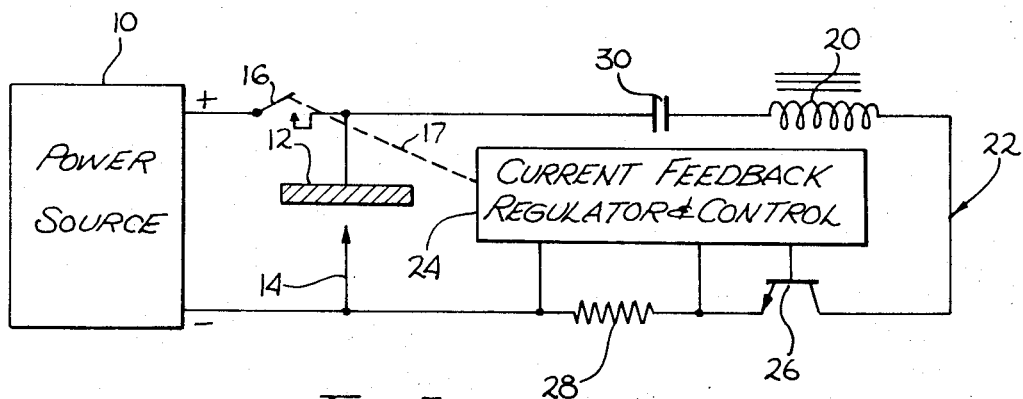
FIG. 3 is an electrical schematic diagram illustrating the principles of this invention in a modified form.
Figure 4:
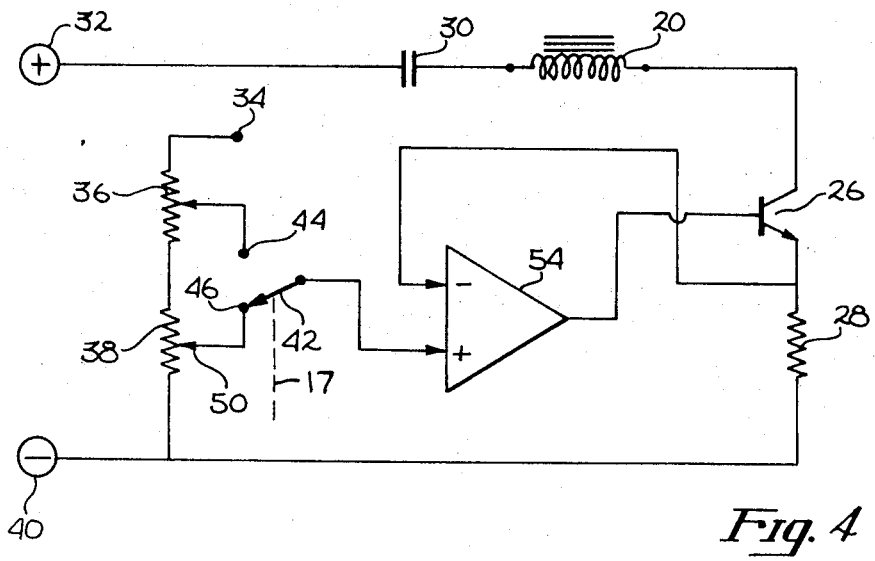
FIG. 4 is an electrical schematic diagram of the current feedback regulator set forth in FIG. 3.

The circuit set forth in FIG. 3 illustrates a practical embodiment of the invention described in the previous description and includes a current feedback regulator and control device 24 which is illustrated in more detail in FIG. 4. One side of the current feedback regulator and control 24 is coupled to the base of a transistor 26, the collector of which is coupled to one leg of the inductor 20. The emitter of transistor 26 is coupled through a resistor 28 to the electrode 14.

A relay switch 30 is coupled between the workpiece 12 and the conductor 20 and is a protective contact which is open during the period of arc initiation.

With reference to FIG. 4, there is shown a circuit of a current limiter 22 and inductor 20 which provides a true reverse polarity operation. The diagram includes a terminal 32 which is coupled to the workpiece 12 and has a normally positive polarity thereon when switch 16 is closed and is also coupled through the relay 30 and the inductor 20 to the collector of transistor 26. A reference voltage is applied to a terminal 34 which is coupled through a pair of potentiometers 36 and 38 to the terminal 40 which is coupled to the electrode 14. A switch 42 is capable of being switched between a pair of terminals 44 and 46. Terminal 44 is coupled to one end of the wiper 48 of potentiometer 36 and terminal 46 is coupled to the wiper 50 of potentiometer 38.

The output of switch 42 is coupled to the positive input of a differential amplifier 54. The output of amplifier 54 is coupled into the base of transistor 26 and the emitter of transistor 26 is coupled back into the negative input of amplifier 54. Thus, the amplifier 54 compares the feedback signal from the resistor 28 and the reference voltage of either potentiometer 36 or 38. Potentiometer 38, for example, is an adjustable means to set the current through the inductor 20 during the time the welding power source supplies current. Potentiometer 36 is an adjustable means to set the current through the inductor 20 during the time the inductor 20 is supplying reverse polarity current. By manipulating the switch 42 to select the particular reference for current, different magnitudes of charging or discharging current through inductor 20 is provided. The switch 42 is connected to operate in synchronism with the on-off control system of the welding current power supply. That is to say, it could operate in synchronism with the switch 16. For clarity of illustration, the synchronism between switches 16 and 42 is depicted schematically in FIGS. 3 and 4 by numeral 17.

Figure 6:
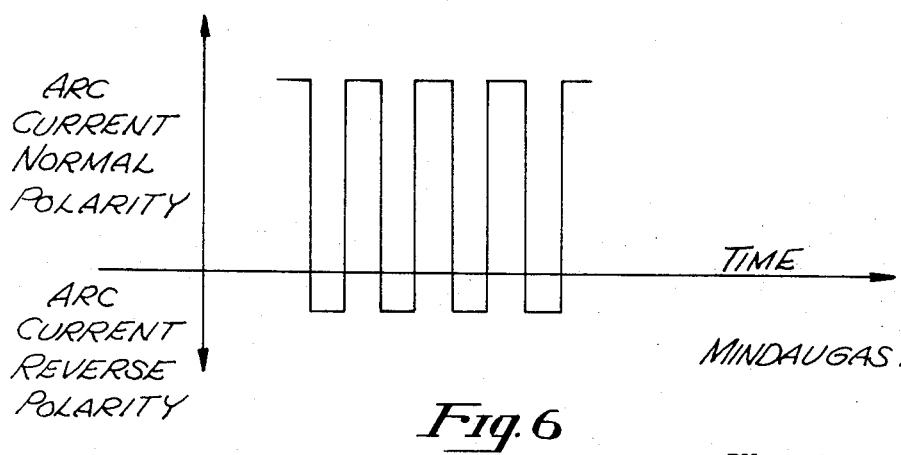
FIG. 6 is a graph illustrating pulses of the circuit as provided in the present invention.

The waveform as shown in FIG. 6 is the polarity of the arc current which allows a substantially larger current to flow through the inductor 20 in the arc current normal polarity, that is, at the time when the welding power source is supplying the arc current. A lesser amount of current is supplied in the reverse polarity provided by the inductor 20 and thus eliminates or diminishes the reverse polarity current decay, as shown in FIG. 5.

The contact 30 is a protective contact which is open during the period of arc initiation. The resistor 28 is a current measuring device for the purpose of providing the feedback current control to the amplifier 54. Thus amplifier 54 then compares the feedback signal with the reference voltage from the potentiometers as hereinbefore set forth and amplifies the difference to drive the transistor 26 to compensate for changes.

Thus an arc welding current polarity reversing system is provided which can be used in conjunction with the appropriate D.C. welding power supplies. An advantage of the particular system is that A.C. action may be obtained at any time merely by connecting the reverse polarity circuit set forth in FIG. 4 across the electrode 14 and the workpiece 12. The A.C. action is controllable over a wide range of straight, that is, normal, and reverse polarity time and current ratios. This A.C. action is controllable in the reverse polarity magnitude as well as in the reverse polarity duration by proper selection of the parameters of the components used therewith. No separate welding power source is needed to obtain the A.C. action and it is found with this circuit that the polarity reversal is obtainable over a wide range of frequencies.

Having thus described one preferred embodiment of this invention, what is claimed is:

1. In combination with a workpiece and a welding electrode, a welding circuit coupled to said workpiece and said welding electrode to establish a welding arc therebetween, the improvement in said welding circuit comprising:
   a source of D. C. energy coupled to said welding electrode and said workpiece so as to provide a first path for current flow;
   means coupled between said source and said workpiece, for serially applying first current pulses of a first polarity through said first current path;
   an inductor coupled across said electrode and said workpiece so as to provide a second current path which includes said inductor, said workpiece and said electrode; whereby a portion of the energy of each of said first current pulses is stored by said inductor, and produces a current of opposite polarity through said second current path during the intervals between said first current pulses; and current regulating means coupled in series with said inductor for limiting the current through said inductor.

2. In combination with a welding apparatus which includes a workpiece and a welding electrode, a welding circuit coupled across said workpiece and said electrode to establish a welding arc therebetween, said welding circuit comprising:

a source of D. C. energy coupled to said welding electrode and said workpiece so as to provide a first path of current flow;

means coupled between said source and said workpiece for serially applying first current pulses of a first polarity through said first current path;

an inductor coupled across said workpiece and said electrode so as to provide a second current path which includes said inductor, said electrode and said workpiece; whereby a portion of the energy of each of said first current pulses is stored by said inductor and produces a current of opposite polarity through said second current path during the intervals between said first current pulses; and current regulating means coupled in series with said inductor for limiting the current through said inductor, said current regulator means including means for limiting the current through said inductor to a first preselected value during the periods of said first current pulses; and for limiting the current through said inductor to a second preselected current level during the intervals between said first current pulses.

3. In combination with a welding apparatus which includes a workpiece and a welding electrode, a welding circuit comprising:

a source of D. C. energy having a positive output terminal and a negative output terminal;

a first switch coupled between said positive output terminal of said source of D. C. energy and to said workpiece, the negative output of said source coupled to said welding electrode;

an inductor having a first end coupled to said workpiece and a second end;

a transistor having a collector coupled to said second end of said inductor, said transistor having a base and an emitter;

a resistive element coupled between said emitter and said welding electrode;

a voltage reference source;

a voltage divider circuit coupled between said voltage reference and said welding electrode, said voltage divider having a first output and a second output;

a second switch operable in unison with said first switch to switch between the first output and the second output of said voltage divider; and a differential amplifier having a first input terminal coupled to the output of said second switch and a second input terminal coupled to said emitter of said transistor, the output of said amplifier coupled to said base of said transistor.

* * * * *